United States Patent [19]

Fleck et al.

[11] 3,958,031

[45] May 18, 1976

[54] PROCESS FOR THE PRODUCTION OF FAT CONTAINING FOOD

[75] Inventors: Charles Jacques Fleck; Jurg Max De Pizzol, both of Thayngen, Switzerland; Peter Tolar, Wels, Austria

[73] Assignee: CPC International Inc.

[22] Filed: Feb. 5, 1975

[21] Appl. No.: 547,324

[30] Foreign Application Priority Data
Feb. 5, 1974   Switzerland.......................... 1559/74

[52] U.S. Cl.............................. 426/579; 426/519; 426/524; 426/589; 426/601; 426/623
[51] Int. Cl.² ...................... F25D 25/00; A23L 3/36
[58] Field of Search ........... 426/285, 325, 327, 541, 426/561, 601, 610, 393, 395, 418, 444, 524, 519, 589, 579, 623, 555, 284, 554, 453; 62/384, 388

[56] References Cited
UNITED STATES PATENTS

| | | | |
|---|---|---|---|
| 3,213,634 | 10/1965 | Granata | 426/524 X |
| 3,275,449 | 9/1966 | Fitzberg | 426/285 |
| 3,404,989 | 10/1968 | Hirtensteiner | 426/524 X |
| 3,406,079 | 10/1968 | Gibble | 426/393 |
| 3,647,480 | 3/1972 | Cetmak | 426/285 |
| 3,677,775 | 7/1972 | Vogel | 426/393 |
| 3,700,461 | 10/1972 | Dickens | 426/285 |
| 3,725,076 | 4/1973 | Stefanucci et al. | 426/393 |
| 3,804,958 | 4/1974 | Adams | 426/284 X |
| 3,804,963 | 4/1974 | Sienkiewicz et al. | 426/453 |
| 3,815,377 | 6/1974 | Tyree | 62/384 X |

OTHER PUBLICATIONS

Lange's "Handbook of Chemistry"; 9th Ed. McGraw Hill; 1956, Handbook Publisher's Inc., Sadusky Ohio; p. 778.
"Structure & Composition of Foods"; Winton; Vol. III; 1937, John Wiley & Sons Inc., New York; p. 224.
Trauberman; "Cryogenics for Which Products?"; Food Engineering, 1966; pp. 86–89.

*Primary Examiner*—S. Leon Bashore
*Assistant Examiner*—Kenneth M. Schor
*Attorney, Agent, or Firm*—Salvatore C. Mitri

[57] ABSTRACT

A process for preparing edible, fat-containing food products is disclosed wherein the dry ingredients of the food product are intimately mixed with a solid, particulate refrigeration agent until the food product has been chilled and refrigerated to a degree sufficient to recover a dry, granular, free-flowing, fat-containing food product therefrom. Dry ice is used in pellet form as the refrigeration agent, and it chills the fat-containing food products without freezing it. This aids in mixing of the fat of the food.

4 Claims, No Drawings

PROCESS FOR THE PRODUCTION OF FAT CONTAINING FOOD

This invention relates to a production of blended food products, particularly those containing fats. According to the invention, the granulated fluid structure of a food product is obtained and maintained through the use of refrigeration during mixing of the food product; in particular, sublimation of solid carbon dioxide (dry ice).

BACKGROUND OF THE INVENTION

Blending of fats of animal or vegetable origin in either liquid or crystallized form into a food product is well-known. The use of prior art techniques, however, very often resulted in the formation of lumps or, when high doses of fats were used, in the production of pasty masses having little or no homogeneity or fluidity. Such products cannot be readily portioned or metered and cannot, therefore, be easily packaged for sale.

Direct refrigeration of solids in granular form by evaporation of liquefied gas is also known. A freezing agent, added in liquid form to the product to be frozen, removes heat by evaporation thus creating the freezing effect.

It is also known that granulated solids such as spices can be cooled directly by the evaporation of a liquefied gas or, where solid $CO_2$ is used, by sublimation of carbonic snow or dry ice fragments of indiscriminate size and shape as is described in Swiss Pat. No. 363,554. This approach has not been satisfactory since the heat generated during the grinding operation results in a sticky mass or, when spices are used, causes the essential oils of the spices to melt or actually volatilize resulting in loss of product.

THE INVENTION

It has been found that the disadvantages of the prior art processes and techniques can be overcome and a free-flowing, homogeneous food product in granular form can be obtained by using a solid refrigeration or freezing agent of particular size and shape during the blending of the food product.

For food products containing fats which are prepared by blending their ingredients, only a few gaseous freezing agents can be used as these freezing agents must not only be chemically inert, but must also comply with toxicological and food law requirements. Among the freezing agents that could be used, solid carbon dioxide (dry ice) is preferred because of its high specific freezing power and the way in which it can be easily and readily handled and metered.

A further advantage in using dry ice is that the carbonic gas released during sublimation provides protection against oxidation of the products which are prepared. This is particularly important when these products contain fatty materials.

As mentioned above, it is not generally sufficient to simply blend the freezing agent and the product to be frozen because the evaporation or sublimation point of the freezing agent is reached too rapidly and in a non-uniform way. Non-uniform freezing of the product results in the formation of lumps that could gradually lead to stickiness and even transformation of the product into a paste. The desired product yield is thereby decreased and, where the product includes a fat phase, its rate of crystallization or recrystallization will be retarded or replaced by either another undesirable crystallization or no crystallization at all.

In accordance with this invention, these disadvantages are avoided by using geometrically uniform pieces of dry ice having a specified volume which are added to the complex fat food product in such a way that, after sublimation of the freezing agent, the food product comprises only homogeneous, free-flowing granules which can be agglomerated into pre-determined portions for sale.

The use of uniform pieces of dry ice, such as in the form of pellets, in intimate contact with the product to be frozen makes it possible to rapidly and precisely control the processing temperature and thereby obtain products containing fat in the form of homogeneous, free-flowing granules.

The pieces of dry ice used in the invention are obtained by extruding carbonic snow. The resulting pellets have a diameter of about 2 to 15 mm and a length of about 10 to 30 mm, preferably about 6 to 10 mm in diameter and about 13 to 20 mm in length.

Another advantage of the invention is that the $CO_2$ gas liberated during blending of the dry ice pellets with the product to be frozen serves as a protective gas in the mixer. Thus, the oxidation action of air on readily oxidized fats, such as chicken fat, is greatly reduced. This contributes to improve the shelf life stability of the product. Before discharging the product from the mixer, the carbonic gas produced is collected by vacuum and can be used as the protective (inert) gas during packaging of the finished product. The packaged product is thus protected against oxidation by air and its shelf-life is thereby improved.

The heat requirements, expressed in terms of calories (Q), to obtain the fluid, free-flowing granular products of the invention can be determined according to the following relationships wherein $Q_1$ represents the calories required to cool the dry blend, $Q_2$ represents the calories required to cool the fat in the dry blend, $Q_3$ represents the calories required to compensate for the heat exchanged with ambient air, $Q_4$ represents the calories required to compensate for heat loss during mixing, and $Q_5$ represents caloric requirements for other, possible heat losses.

A. If $G_1$ is the quantity in kilograms [kg] of dry product, Cp its specific heat in [KCal]/[Kg°C], $t_1$ the initial temperature in [°C] and $t_2$ the planned final temperature, the caloric need, $Q_1$, can be represented by the equation.

$$Q_1 = G_1 \cdot cp \cdot (t_1 - t_2) \qquad [1]$$

B. If $G_2$ is the quantity of dry fat in [kg], and $i$ is the difference in enthalpy value [KCal]/[Kg] between the initial temperature $t_1$ and the final temperature $t_2$ in [°C], the caloric need, $Q_2$, can be expressed by the equation $$Q_2 = G_2 \cdot i \qquad [2]$$

C. If $t_4$ is the ambiant temperature, K the coefficient of heat transfer in [KCal]/[m²h°C] and $F_1$ the surface area of the mixer [m²], the caloric needs, $Q_3$, are represented by the equation $$Q_3 = KF_1 (t_4 - t_2) \quad [3]$$

D. The caloric needs, $Q_4$, to compensate for the heat produced by the work done in the mixer can be estimated at 20% of the energy absorbed by the mixer.

E. The possible caloric losses, $Q_5$, are generally in the order of 10% of $Q_3 + Q_4$. Thus, the total caloric need, Q can be thus expressed as $$Q = Q_1 + Q_2 + Q_3 + Q_4 + Q_5$$

This total caloric need, Q, is supplied by the sublimation heat of the dry ice which, at 1 atm. is 137 KCal/kg. when $t_4$ is $-78.5°C$.

The absorption of heat by the dry ice pellets can be described by the following relation:

$$Q = \alpha \cdot F_2 \cdot (t_2 - t_4) \quad [4]$$

where $F_2$ is the surface area of the pellets in $[m^2]$ and $\alpha$ the coefficient of heat transfer in $[KCal]/[m^2h°C]$. This high coefficient, due to sublimation of the dry ice pellets in contact with the product, increaes even more based upon the need for the product to come into contact with the pellets. $\alpha$ can vary according to the nature and the strength of the movements of the mixer. Thus, from equation [4], it can be deduced that an increase of the surface $F_2$ also determines the rate of exchange of temperatures.

An important feature of the invention process resides in the ability to obtain in conventional, mechanical blenders, the desired residence time of intimate contact of food components with the volume and surfaces of the pieces of dry ice. Thus, the residence time of the food components and the dry ice particles can be closely controlled to obtain the desired degree of crystallization.

Application of the process of the invention is not influenced by weather conditions. For example, at high temperatures during the summer, or in tropical countries, where the fats used in the invention would normally remain liquid, the process can be used to obtain products of a constant quality, the product not being influenced by the weather conditions.

The process can also be used when the food components and/or the fats require preheating and is applicable to the preparation, in a fluid, dry form, of compounded food products of various compositions containing fats such as soups, broths, bouillons, sauces, baby food, substitutes for milk and creams, the production of fat containing feeds, and the like, and imparts to the end products properties that could previously only be obtained by the use of expensive and complicated processes.

The following examples are set forth to illustrate various applications of the invention and are not intended to limit, nor be construed as limiting, the scope of the invention.

In the following examples, the dry or powdered compounds or components are all commercially obtained ingredients.

EXAMPLE 1 — BEEF BROTH 595 kg dry compounds comprising monosodium glutamate, salt, yeast extract, beef extract and spices at 20°C. are blended for 3 minutes in a vertical mixer equipped with a screw. 105 kg whipped fat is added at a temperature of 20°C. and mixed for 2 minutes. To this blend, which has a temperature of 22°C., 21 kg of dry ice is added. This dry ice, in the form of cylindrical fragments of 3.18 mm in diameter and 10 - 40 mm length, is added while the mixing is continued over a period of 5 minutes. Temperature is then 12°C. and homogeneous, free-flowing granules are obtained. These can be readily agglomerated into 12 kg cubes.

EXAMPLE 2 — CHICKEN BROTH 250 kg dry components comprising monosodium glutamate, salt, yeast extract, chicken extract and spices are premixed for 6 minutes in a double kneader at 20°C. with 42 kg liquid chicken fat. Then, 15.5 kg dry ice is added (9.52 mm diameter, 10 - 20 mm length) and the blend is mixed for a further 6 minutes. The homogeneous, granular free-flowing mass which has a temperature of 16°C., is agglomerated into cubes.

EXAMPLE 3 — CHICKEN BROTH WITH HIGH FAT CONTENT

The process is the same as in Example 2 except that the quantity of liquid chicken fat added is 60 kg. Because of the high content of fat, 30 kg of dry ice of the same dimension as that of the preceding example is needed. To reduce oxidation, the carbonic gas remains in the mixer. The product, in fluid, homogeneous granulated form, is withdrawn into packets.

EXAMPLE 4 — MUSHROOM SOUP 620 kg of dry components comprising wheat flour, rice flour, monosodium glutamate, salt, yeast extract, hydrolysed vegetable protein, mushroom powder and extract and spices at 20°C. are pre-mixed in a vertical screw mixer for five minutes. The ambient temperature is 22°C. There is then added, while continuing to mix well, 95 kg of liquid fat and immediately after, 21 kg of dry ice in pellet form of 6.35 mm in diameter. After 12 minutes of total mixing, the product obtained in fluid, granulated form is directly packed in packets.

EXAMPLE 5 — GOULASH BASE

In a two-winged malaxer-mixer, 250 kg of commercially obtained dry components for goulash at 20°C. are sprayed with 50 kg of liquid fat and well mixed for 3 minutes. There is then added 22.5 kg of dry ice in uniform geometric fragments (diameter = 12.7 mm, length = 10 to 20 mm). The mixer stays running. The final product reaches a temperature of 15°C. and is obtained in a fluid, granulated form which, upon extraction from the mixer, is directly compressed into cubes.

EXAMPLE 6 — WHITE SAUCE

The powdered components comprising wheat flour, rice flour, monosodium glutamate, salt, yeast extract and hydrolysed vegetable protein at 21°C. are mixed in the ratio of 3 : 1 with liquid fat at 50°C., introduced by injection, in a ribbon blender for continuous operation. There is then added in a second mixer of the same type during decanting of the mixture, 10% by weight of dry ice in pellet form of 2 mm in diameter. The homogeneous fluid white sauce thus obtained reaches 18°C. temperature. It is extracted into jars.

EXAMPLE 7 — PUDDING POWDER 75 kg of sugar, 50 kg of powdered skimmed milk, 30 kg of glyceromonopalmitate, 3 kg of bisodium phosphate, 1 kg of sodium alginate, 16 kg of soluble starch and 1 kg of raspberries are mixed at 23°C. in an intensive projection mixer for 2 minutes. While maintaining the same regulation of the mixer, there is added 54 kg of swelled vegetable fat (temperature 26°C.) and mixing is continued for 3 more minutes after which there is introduced 14.5 kg of dry ice pellets of 2 mm in diameter and 10 to 20 mm in length. When sublimation of the dry ice is ended, the homogeneous product reaches a temperature of 10°C. and is obtained in the form of a fluid powder.

EXAMPLE 8 — IMITATION CREAM POWDER 50 kg of powdered skimmed milk, 25 kg of saccharose, 24 kg of distilled monoglycerides, 3 kg of lecithin, 24 kg of sodium pyrophosphates and 1 kg of flavorings are carefully mixed in a vertical screw mixer for 5 minutes, the ambient temperature being 28°C. To the product thus mixed, there is added 110 kg of peanut oil at 45°C. After 5 minutes of mixing, there is introduced in small amounts 28 kg of dry ice pellets (diameter = 9.52 mm, length = 10 to 20 mm). The final product is homogeneous and is obtained in the form of free-flowing granules.

We claim:

1. In the process of preparing a dry, substantially powdery, edible, fat-containing product by mixing together fat plus the other ingredients of said product to form a mixture thereof and subsequently recovering the finished product, the improvement comprising adding, during the mixing of the ingredients and the fat, solid particles of dry ice of geometrically uniform shape and size, and particles having a diameter of about 2 mm.–15 mm. and a length of about 10 mm.–40 mm. said particles being added in an amount such as to lower the temperature of the mixture without freezing said mixture during mixing to such an extent as to render the entire mixture free-flowing and homogeneous.

2. The process of claim 1 wherein said dry ice particles are in the form of pellets prepared by extrusion of carbonic snow.

3. The process of claim 1 wherein the gaseous $CO_2$ emitted upon the sublimation of the dry ice particles is retained in the mixing vessel to serve as a protective gas during the mixing.

4. The process of claim 1 wherein immediately upon recovery the finished product is compressed into portions of pre-determined size.

* * * * *